US012627824B2

(12) United States Patent (10) Patent No.: US 12,627,824 B2
Zhao et al. (45) Date of Patent: May 12, 2026

(54) SYSTEMS AND METHODS FOR ENTROPY CODING FOR RECURSIVE INTRA REGION PARTITIONING

(71) Applicant: Tencent America LLC, Palo Alto, CA (US)

(72) Inventors: Liang Zhao, Palo Alto, CA (US); Xin Zhao, Palo Alto, CA (US); Madhu Peringassery Krishnan, Palo Alto, CA (US); Yushin Cho, Palo Alto, CA (US); Han Gao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 97 days.

(21) Appl. No.: 18/633,363

(22) Filed: Apr. 11, 2024

(65) Prior Publication Data

US 2025/0175635 A1    May 29, 2025

Related U.S. Application Data

(60) Provisional application No. 63/603,056, filed on Nov. 27, 2023.

(51) Int. Cl.
*H04N 19/00* (2014.01)
*H04N 19/13* (2014.01)
(Continued)

(52) U.S. Cl.
CPC ............. *H04N 19/44* (2014.11); *H04N 19/13* (2014.11); *H04N 19/176* (2014.11); *H04N 19/91* (2014.11)

(58) Field of Classification Search
None
See application file for complete search history.

(56) References Cited

U.S. PATENT DOCUMENTS

2014/0226720 A1* 8/2014 Park ..................... H04N 19/593
375/240.13
2016/0057430 A1 2/2016 Kolesnikov et al.
(Continued)

OTHER PUBLICATIONS

Peter de Rivaz et al., "AV1 Bitstream & Decoding Process Specification", Version 1.0.0 with Errata 1, The Alliance for Open Media, Jan. 2019, 681 pgs.

(Continued)

*Primary Examiner* — Zhihan Zhou
(74) *Attorney, Agent, or Firm* — Morgan, Lewis & Bockius LLP

(57) ABSTRACT

An example method of video coding includes receiving a video bitstream including a plurality of coding blocks; identifying a coding region that includes two or more coding blocks of the plurality of coding blocks that are encoded in a first prediction mode. The method also includes entropy decoding a signaled flag indicating a prediction mode for the coding region, the entropy decoding using coded information including one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks; and reconstructing the two or more coding blocks according to a value of the signaled flag for the coding region.

16 Claims, 7 Drawing Sheets

(51) Int. Cl.

| | |
|---|---|
| *H04N 19/176* | (2014.01) |
| *H04N 19/44* | (2014.01) |
| *H04N 19/91* | (2014.01) |

(56) References Cited

U.S. PATENT DOCUMENTS

| | | | |
|---|---|---|---|
| 2018/0192076 A1* | 7/2018 | Ikai | H04N 19/176 |
| 2018/0288446 A1 | 10/2018 | An et al. | |
| 2019/0306518 A1 | 10/2019 | Oh et al. | |
| 2020/0021811 A1 | 1/2020 | Nguyen et al. | |
| 2021/0037242 A1 | 2/2021 | Zhao et al. | |
| 2021/0084306 A1 | 3/2021 | Sasai et al. | |
| 2021/0235079 A1 | 7/2021 | Chuang et al. | |
| 2022/0038692 A1 | 2/2022 | Ko et al. | |
| 2022/0046255 A1 | 2/2022 | Zhu et al. | |
| 2022/0070483 A1 | 3/2022 | Liu et al. | |
| 2022/0094958 A1 | 3/2022 | Kim et al. | |
| 2022/0248009 A1 | 8/2022 | Xu et al. | |

OTHER PUBLICATIONS

Urvang Joshi et al., "Uneven 4-Way Partitions", Alliance for Open Media, Codec Working Group, Document: CWG-D035_v2, Google LLC, Jun. 2023,9 pgs.

Yue Chen et al., "Extended Recursive Partitions (Amendment 1)", Alliance for Open Media, Codec Working Group, Document: CWG-C090, Google LLC, Dec. 2022, 13 pgs.

Tencent America LLC, ISRWO, PCT/US2024/025262, Aug. 2, 2024, 7 pgs.

Tencent America LLC, ISRWO, PCT/US2024/025263, Aug. 12, 2024, 10 pgs.

Tencent America LLC, ISRWO, PCT/US2024/025266, Aug. 12, 2024, 9 pgs.

Tencent America LLC, ISRWO, PCT/US2024/025268, Aug. 7, 2024, 9 pgs.

Tencent America LLC, ISRWO, PCT/US2024/025269, Aug. 7, 2024, 10 pgs.

Yu-Wen Huang et al., "Block Partitioning Structure in the VVC Standard", IEEE Transactions on Circuits and Systems for Video Technology, vol. 31, Iss. 10, Jun. 2021, 16 pgs.

* cited by examiner

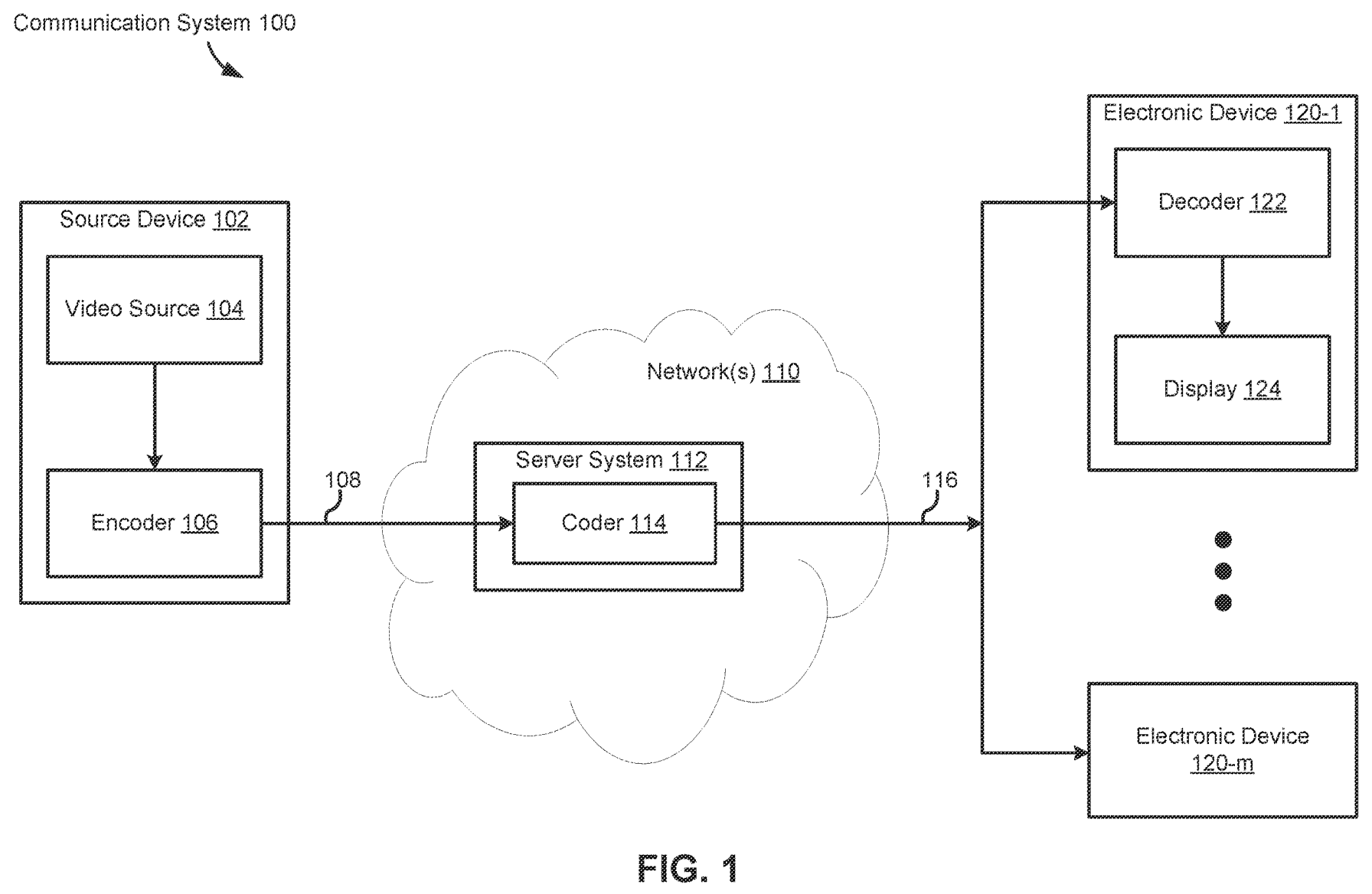

Communication System 100

Electronic Device 120-1

Decoder 122

Display 124

Electronic Device 120-m

116

Network(s) 110

Server System 112

Coder 114

108

Source Device 102

Video Source 104

Encoder 106

FIG. 1

Level 1     Level 2     Level 3     Level 4

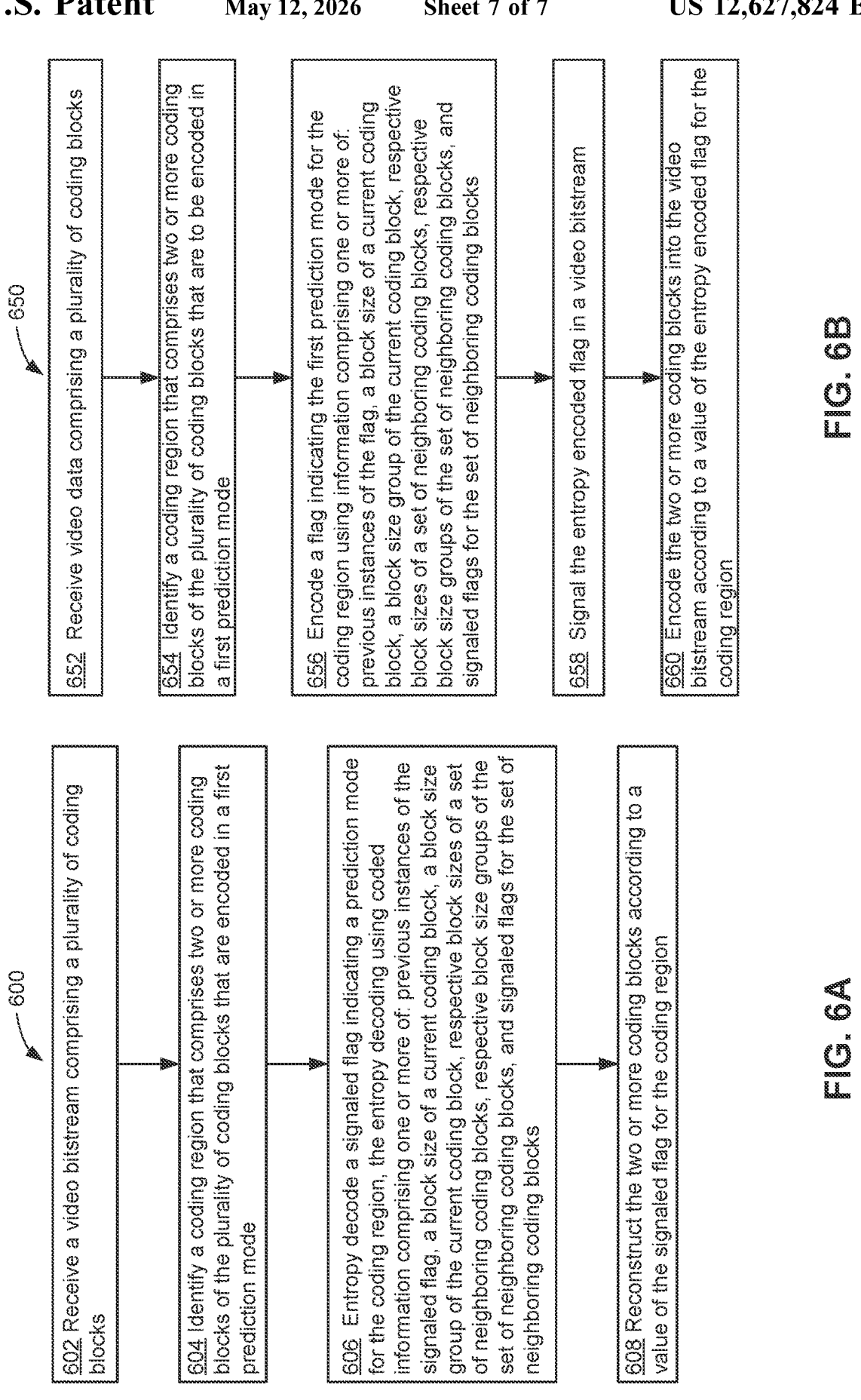

650

652 Receive video data comprising a plurality of coding blocks

654 Identify a coding region that comprises two or more coding blocks of the plurality of coding blocks that are to be encoded in a first prediction mode 656 Encode a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks 658 Signal the entropy encoded flag in a video bitstream 660 Encode the two or more coding blocks into the video bitstream according to a value of the entropy encoded flag for the coding region

602 Receive a video bitstream comprising a plurality of coding blocks

604 Identify a coding region that comprises two or more coding blocks of the plurality of coding blocks that are encoded in a first prediction mode 606 Entropy decode a signaled flag indicating a prediction mode for the coding region, the entropy decoding using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks 608 Reconstruct the two or more coding blocks according to a value of the signaled flag for the coding region

FIG. 6A

SYSTEMS AND METHODS FOR ENTROPY CODING FOR RECURSIVE INTRA REGION PARTITIONING

RELATED APPLICATIONS

This application claims priority to U.S. Provisional Patent Application No. 63/603,056, entitled "Entropy Coding for Recursive Intra Region Partitioning" filed Nov. 27, 2023, which is hereby incorporated by reference in its entirety.

TECHNICAL FIELD

The disclosed embodiments relate generally to video coding, including but not limited to systems and methods for using coded information as context for entropy coding signaled flags.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to block partitioning, intra prediction, and coding of signaled flags. Some embodiments include using coded information (e.g., relating to the current block and/or neighboring blocks) as a context for a probability model used to entropy encode a signaled flag. Using coded information as context for the probability model may improve accuracy and efficiency of entropy coding as compared to systems in which the coded information is not used as the context for the probability model. The use of coded information as the context for entropy coding a signaled flag helps to reduce the amount of overhead required for signaling flags that indicate a characteristic of a coding region.

In accordance with some embodiments, a method of video decoding includes (i) receiving a video bitstream including a plurality of coding blocks; (ii) identifying a coding region that comprises two or more coding blocks of the plurality of coding blocks that are encoded in a first prediction mode; (iii) entropy decoding a signaled flag indicating a prediction mode for the coding region, the entropy decoding using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks; and (iv) reconstructing the two or more coding blocks according to a value of the signaled flag for the coding region.

In accordance with some embodiments, a method of video encoding includes (i) receiving video data comprising a plurality of coding blocks; (ii) identifying a coding region that comprises two or more coding blocks of the plurality of coding blocks that are to be encoded in a first prediction mode; (iii) entropy encoding a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks; (iv) signaling the entropy encoded flag in a video bitstream; and (v) encoding the two or more coding blocks into the video bitstream according to a value of the entropy coded flag for the coding region.

In accordance with some embodiments, a method of processing visual media data includes: (i) obtaining a source video sequence that includes a plurality of frames; and (ii) performing a conversion between the source video sequence and a video bitstream of visual media data, where the bitstream comprises: (a) a plurality of encoded blocks corresponding to the plurality of frames; (b) identification of a coding region of a frame of the plurality of frames, where the coding region comprises two or more coding blocks that are encoded in a first prediction mode; and (c) a signaled flag for the coding region that is entropy coded using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system.

The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
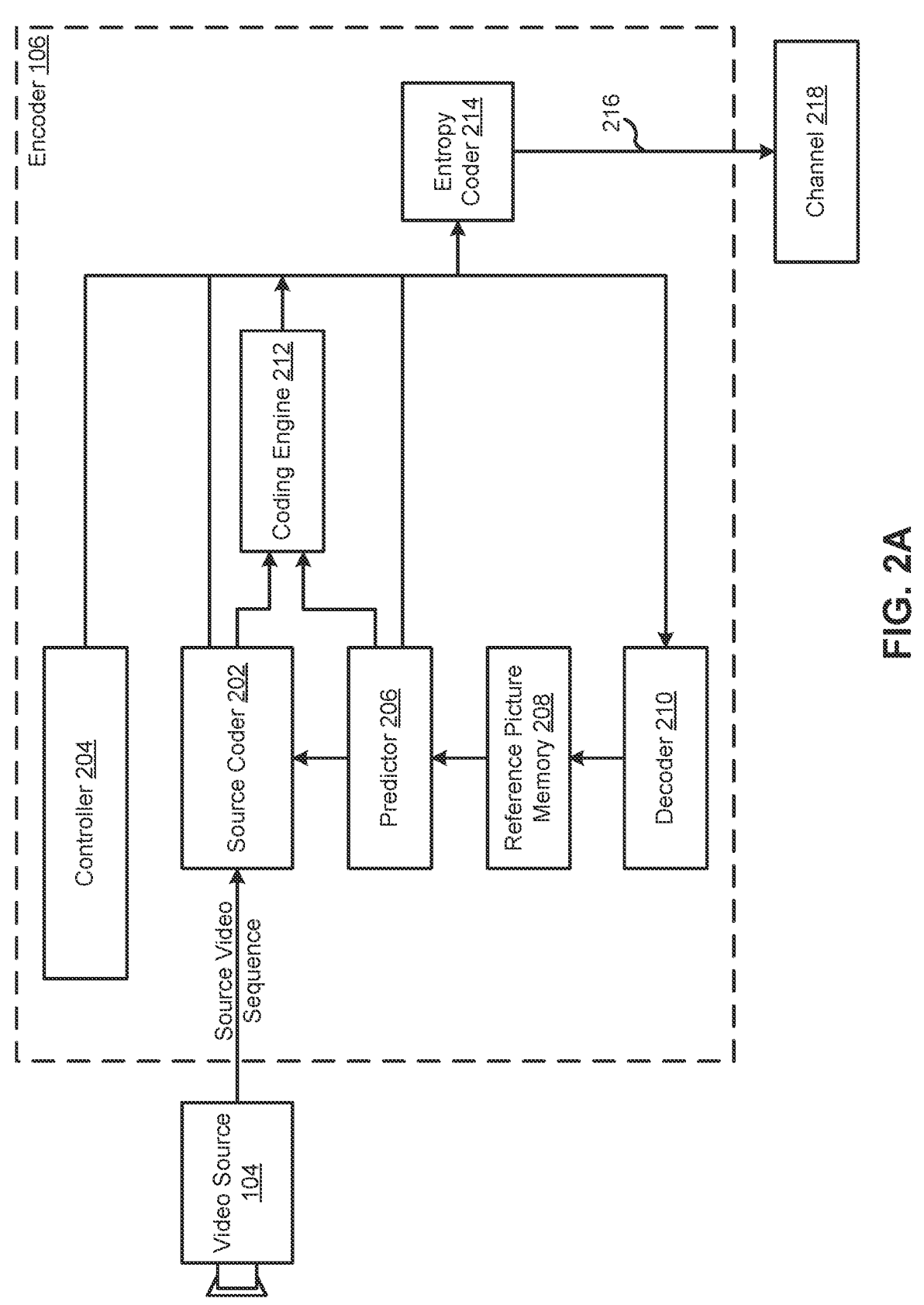
FIG. 2A is a block diagram illustrating example elements of an encoder component in accordance with some embodiments.

The present disclosure describes video/image compression techniques including entropy coding of a signaled flag that indicates a characteristic of a coding region. When splitting (e.g., recursively, or using a pre-defined splitting pattern) a block into one or multiple of equal size or smaller size subblocks, a flag (e.g., called region_type_flag) may be signaled to indicate whether all the subblocks within the current block are coded with a first predefined prediction mode or not. The first predefined prediction mode can be an intra coding mode, an inter coding mode, and/or a mixture of intra and inter coding mode. The coded information that is used as the context for entropy encoding the flag can include one or more of: previous instances of the flag, a block size of the current block, a block size group of the current block, respective block sizes of a set of neighboring blocks, respective block size groups of the set of neighboring blocks, and signaled flags for the set of neighboring coding blocks. An advantage of using entropy coding for recursive intra region partitioning is to provide a better design for signaling the intra region flag to improve the context used for entropy coding and to improve efficiency of entropy coding, while minimizing the overhead used in signaling.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
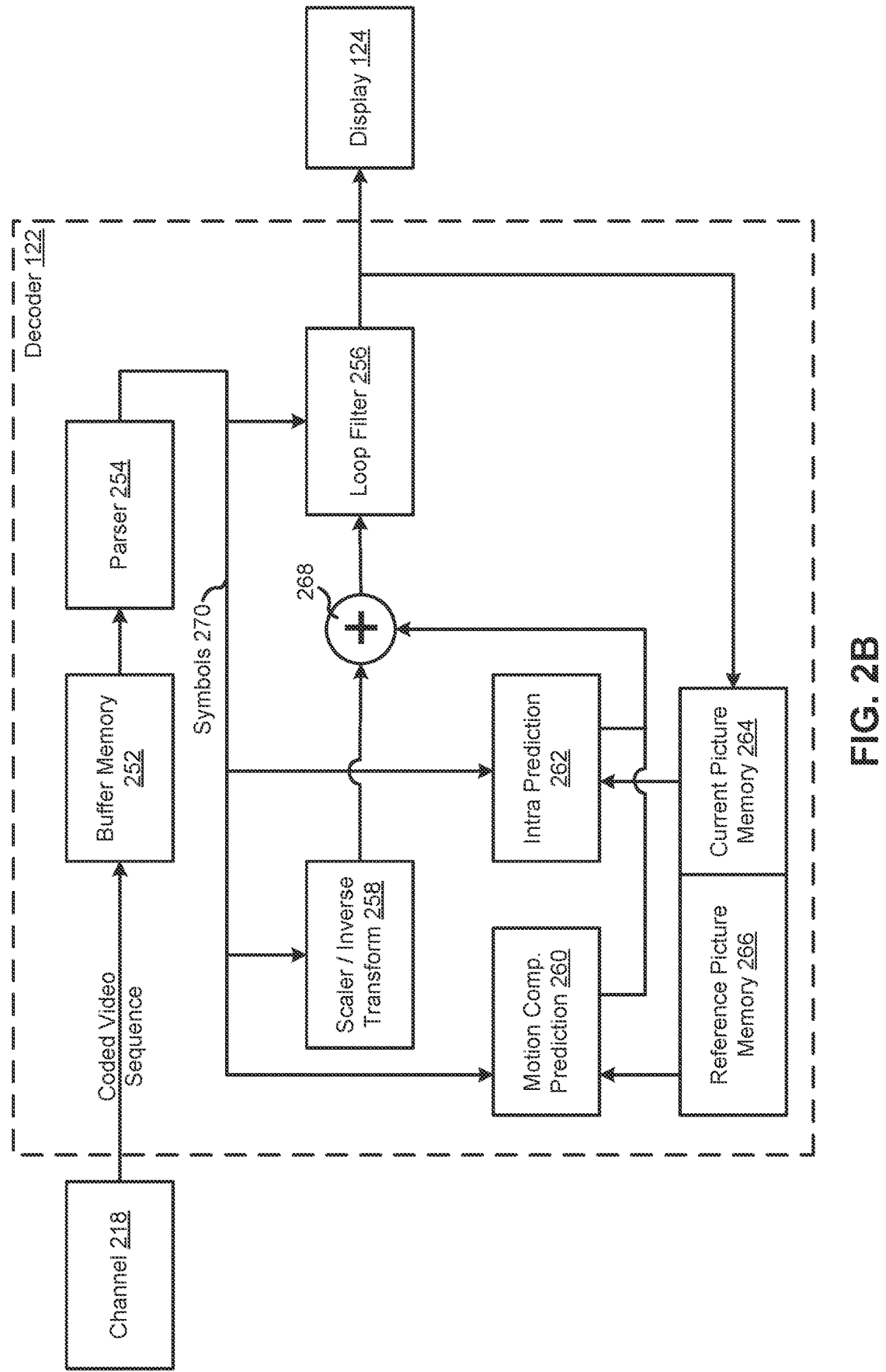
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
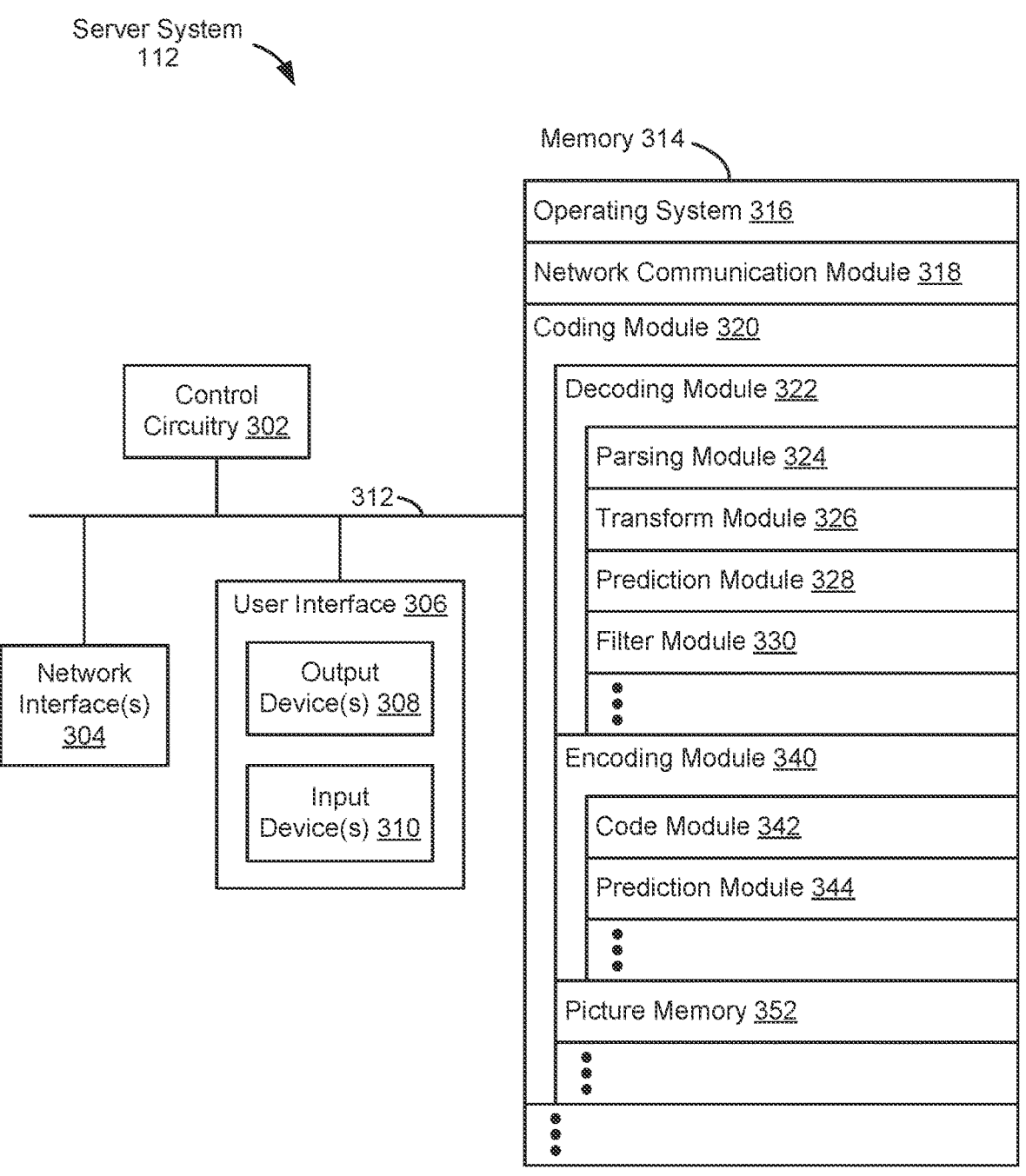
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, a block (or subblock) refers to the coding block with the coding block (such as super block, or largest coding unit, or coding tree block), a prediction block, a transform block, or a filtering unit. For example, a subblock of a block A refers to a block whose area is fully contained in the block A.

In the following, a block region refers to a specific block area which contains one or more blocks. A block size group refers to the group to which the current block belongs. Blocks of multiple sizes may belong to a single group. A block size group is a collection of multiple block sizes, e.g., multiple block sizes that are similar to each other (e.g., in terms of number of samples, or difference between width and/or height) may be assigned as a block size group.

Block partitioning for coding and decoding, general partitioning may start from a base block (e.g., a superblock or root node) and may follow a predefined ruleset, partition structure, and/or scheme. The partitioning may be hierarchical and/or recursive. After dividing or partitioning a base block using any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB), such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The hierarchical structure of for all color channels may be collectively referred to as coding tree unit (CTU). The partitioning patterns or structures for the various color channels in a CTU may or may not be the same.

In some embodiments, either intra coding or inter-coding is allowed in different portions of a particular coding region of a frame. Specifically, either intra coding or inter-coding may be allowed in different portions of a frame specified as an inter-prediction frame. In some embodiments, if intra-inter prediction mode is permitted, either intra coding, or inter coding, or intra-inter coding is allowed in different portions of a particular coding region of a frame (e.g., an inter coded frame). In particular, a portion or an entirety of a region of a frame or picture or slice at various partitioning levels (e.g., various recursive partitioning levels) may be coded in either inter prediction mode or intra prediction mode, or when intra-inter prediction is permitted, in either inter prediction mode, or intra prediction mode, or intra-inter prediction mode. An intra-inter coding/prediction mode refers to a coding mode that generates a prediction block using both intra and inter prediction methods. For example, a prediction mode that derives the prediction block as a weighted sum of an intra prediction block and an inter prediction block.

A region, or coding region, may be used to refer to any level in any one of the partitioning schemes described above or in other partitioning schemes not specifically described above. A region therefore may be a frame, a slice, a super block, a macroblock, a subblock, a prediction block, and the like. For example, a region may be any partitioning level of a recursive partitioning scheme. A region may be at a leaf level or non-leaf level of a particular partitioning scheme. A leaf level region is a region not further partitioned. A non-leaf level region, on the other hand, is further partitioned into at least two child regions, each of which may be at a leaf level or may be at a non-leaf level and thus may be further partitioned. A leaf level region is predicted in whole using a particular prediction mode. For example, a leaf-level region may be either inter coded or intra coded. Optionally, a leaf level region may additionally be intra-inter coded if intra-inter prediction mode is permitted.

In some embodiments, when splitting a region into one or multiple sub-regions, at least one flag or syntax element is included in the bitstream by an encoder (and subsequently received, parsed, and decoded by a decoder) to indicate whether all the child regions in the region are all coded with a pre-defined prediction mode. Such a flag may be referred to as a region type flag or a regional prediction mode flag syntax element at various regional signaling levels. The partitioning scheme, for example, may be a recursive partitioning scheme, and at least one such flag may be included in the bitstream by an encoder to indicate whether all child regions within this region are coded with the pre-defined prediction mode. When all coding blocks of a region at a particular partitioning level are either all coded in the predefined prediction mode (e.g., all intra coded, all inter coded, or all intra-inter coded), then an overall regional prediction mode flag as described above may be included at the region level in the bitstream for such indication, thereby removing the necessity of including such indicators or flags at lower partitioning levels, and further removing the necessity of the normal signaling of a prediction mode at the leaf level. Signaling overhead may thus be reduced. As such, when the decoder determines via parsing the regional prediction mode flag syntax element that all child regions in the region are coded in the predefined prediction mode, it would not expect to see any additional such flags at lower partitioning level of the region and thus can skip parsing for such lower-level flags.

When the decoder parses the bitstream and determines that the parsed syntax associated with such a flag for the region indicates that coded lower-level/child regions within the region can use different prediction modes, then decoder may expect additional lower-level regional prediction mode flag(s)/indicators (optionally at each of the corresponding partitioning level within the coding region) in the bitstream corresponding to lower-level/child regions of this region for indicating whether each of the child regions are coded under a predefined prediction mode (e.g., under an intra prediction mode, an inter prediction mode, or an intra-inter prediction mode). In some embodiments, a region type flag may not be included in the bitstream and thus is not received at the decoder side when the block partitioning mode syntax indicates current region is not further split (e.g., the current region is a leaf level partition). Another leaf level flag may be included instead to indicate whether this leaf partition is intra coded, inter coded, or intra-inter coded, if there has been no higher-level flag indicating that this partition is all intra-coded or all inter-coded. In some embodiments, one high level syntax may be included in the bitstream by the encoder and received at the decoder side to indicate whether the indication for the predetermined prediction mode can be applied to current sequence/frame/slice/super block or not. In other words, whether the scheme above is used at and below a particular partition level may be enabled or disabled. If it is disabled, then no region level flag as described above may be included in the bitstream, and prediction mode may instead be indicated at leaf level for each of the leaf blocks.

Figure 4A:
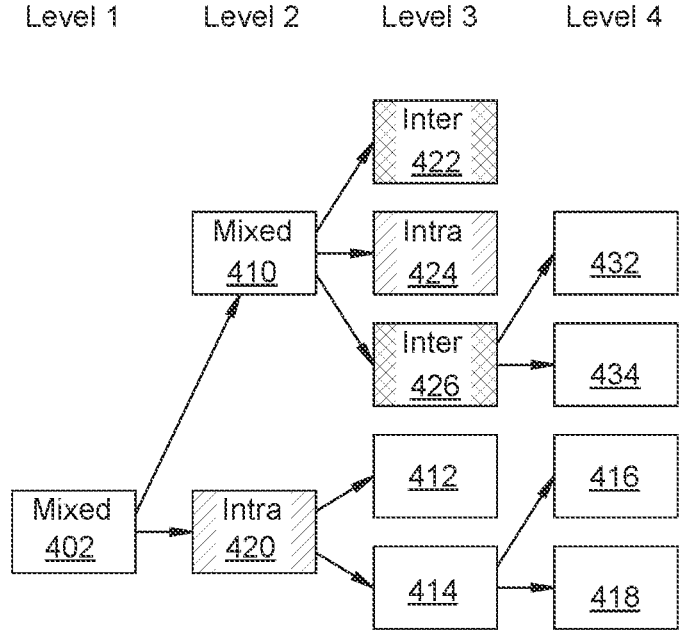
FIGS. 4A and 4B illustrate an example of partitioning of coding blocks into regions in accordance with some embodiments.

FIG. 4A illustrates an example of signaling a region type flag for a coding region based on coded information of a current coding block and/or a set of neighboring blocks. The region type flag, such as intra_region_flag, inter_region-_flag, mixed_region_flag, intra-inter_region_flag, or other region type flags, indicates a type of prediction mode used to encode all coding blocks within a coding region. For example, intra_region_flag indicates that a corresponding region in, e.g., a frame of inter-prediction type (signaled by higher level syntax, such as a frame-level syntax) includes coding blocks that are all intra-coded (e.g., coded using an intra prediction mode). Similarly, inter_region_flag indicates that a corresponding region includes coding blocks that are all inter-coded (e.g., coded using an intra prediction mode). In contrast, mixed_region_flag indicates that a corresponding region includes some coding blocks that are intra-coded, and some coding blocks that are all inter-coded, while intra-inter_region_flag indicates that a corresponding region includes coding blocks that are all coded as weighted sums of one or more inter-prediction blocks and one or more intra-prediction blocks. FIG. 4A shows, as an example partitioning scheme, a top region 402 (e.g., a superblock) that is partitioned into regions or blocks at four levels or depths labeled as level 1 through level 4. Leaf level regions (sometimes also called leaf partitioning tree nodes) include regions 412, 416, 418, 422, 424, 432, and 434. Regions in FIG. 4A that include a label of "mixed," "intra," or "inter" represent regions having a corresponding region type flag. Conversely, the absence of labels in blocks illustrated in FIG. 4A indicates that region type flags are optionally not present, or that the decoder does not need to detect the presence (e.g., skip the parsing) of region type flags for the corresponding child regions or blocks.

In FIG. 4A, the top region 402 includes a mixed_region-_flag. The presence of mixed_region_flag for top region 402 indicates that one or more first coding blocks (e.g., a first region) in top region 402 are intra-coded, and one or more second coding blocks (e.g., a second region) in top region 402 are inter-coded. In this example, top region 402 is partitioned into two regions, region 410, and region 420, which are both partitions at level 2, and at a depth of one from the top region 402. For example, top region 402 is partitioned in accordance with a predetermined partitioning scheme.

The intra_region_flag is present for region 420, indicating that all the coding blocks within region 420 are intra-coded. The region 420 further partitions into region 412 and region 414. The region 414, a level 3 partition at a depth of two from top region 402, is further partitioned into region 416 and region 418, which are partitions at level 4, and at a depth of three from top region 402. No intra_region_flags may be present for 412, 414, 416 and 418 because they are all partitions of region 420 and have been flagged at region 420 as being intra-coded. As such, the decoding component optionally will not perform any additional determination of intra_region_flags when parsing any partitions below region 420, including regions 412, 414, 416, and 418. Optionally, regions 412, 416, and 418 that are also leaf partitions may not include any other prediction mode indicators as they are intra-coded as indicated by the presence of intra_region-_flags at region 420.

The mixed_region_flag is present for region 410, indicating that one or more first coding blocks (e.g., a first region) in region 410 are intra-coded, and one or more second coding blocks (e.g., a second region) in region 410 are inter-coded. The region 410 further partitions into region 422, region 424, and region 426, which are level 3 partitions. The inter_region_flag is present for region 422, indicating that all the coding blocks within region 422 are inter-coded, and the intra_region_flag is present for region 424, indicating that all the coding blocks within region 424 are intra-coded. The inter_region_flag is present for region 426, indicating that all the coding blocks within region 422 are inter-coded. Further, region 426 is partitioned into two level 4 partitions of region 432 and region 434. No inter_region-_flags may be present for 432 and 434 because they have both been flagged at region 426 as being inter-coded.

The regions 422, 424, 432, 434, 412, 416, and 418 are leaf partitions. Optionally, the decoder does not determine whether any region type flags are present for leaf partitions and/or reads a leaf-level prediction mode indicator for the leaf partitions to determine their respective prediction mode. For example, a leaf partition under a region having a mixed_region_flag optionally does not include a region type flag but instead includes a prediction mode indicator for the decoder to determine the prediction mode of the leaf partition. In contrast, because regions 432, 434 are leaf partitions under an inter-coded region, region type flags and prediction mode indicators are optionally not signaled for these regions (e.g., all coding blocks in 432, 434 are inferred as inter-coded blocks). Similarly, because regions 416 and 418 are leaf partitions under an intra-coded region, region type flags and prediction mode indicators are optionally not signaled for these regions (e.g., all coding blocks in regions 432 and 434 are inferred as intra-coded blocks).

Figure 4B:
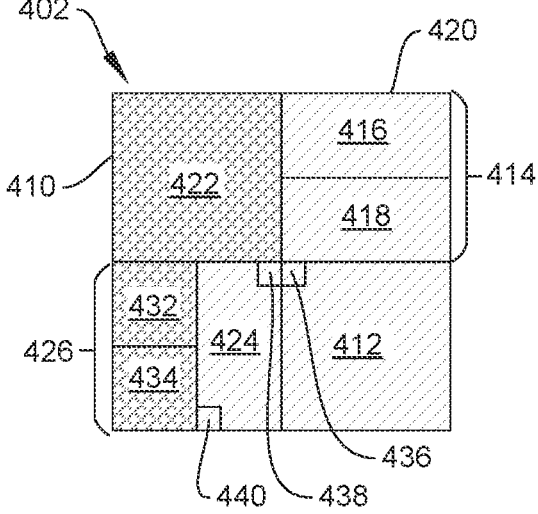

FIG. 4B illustrates an example partitioning pattern corresponding to the partition scheme described above with respect to FIG. 4A. For example, top region 402 is vertically split into two equal sized second level regions 410, and 420. The second level region 420 is further horizontally split into two equally sized third level regions 412 and 414. The region 414 is further horizontally split into two equally sized fourth level regions 416 and 418. The second level region 410 is further split into three third level regions 422, 424, and 426 (e.g., illustrated by partition 506 in FIG. 5). The region 426 is further horizontally split into two equally sized regions 432 and 434, that are level 4 partitions. In this example, the diagonal line shaded regions 420, 412, 414, 416, 418 and 424 are all intra-coded, whereas cross-hatched regions 422, 426, 432, and 434 are all inter-coded. In this example, the mixed_region_flag for the region 402 may be signaled, optionally with a predefined value to indicate that the region 402 includes both coding blocks that are intra-coded and coding blocks that are inter-coded. Similarly, intra_region_flag may be signaled for each of the regions 420, 412, 414, 416, 418, and 424 that are all intra-coded. For the region 420, intra_region_flag is signaled to indicate that all subsequent partitions are all intra coded. Consequently, no further lower level intra_region_flags are included for regions 412, 414, 416, 418, no matter whether they are leaf level partitions or not. This may help to reduce signaling overhead. Similarly, inter_region_flag may be used to indicate that regions 422, 426, 432 and 434 are all inter-coded. For top region 402, and region 410, mixed_region_flag may be used to indicate that some coding bocks are inter-coded while others are intra-coded.

Figure 5:
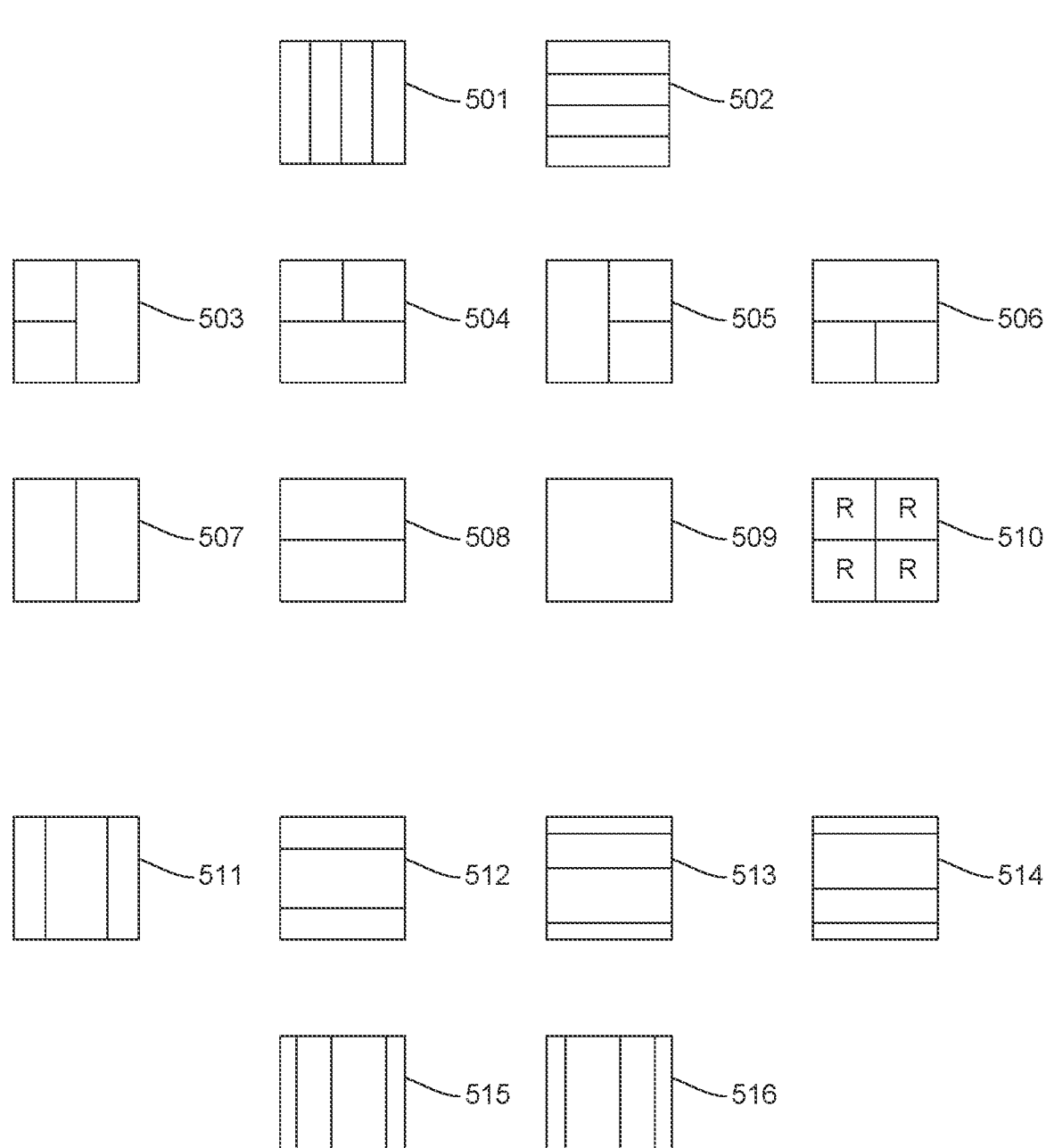
FIG. 5 illustrates different types of coding block partitioning in accordance with some embodiments.

FIG. 5 shows various partition types and partitioning structures in accordance with some embodiments. The partition types and/or structures illustrated in FIG. 5 may be used with the regions and flags described previously with respect to FIGS. 4A and 4B. An example predefined 10-way partitioning structure allows recursive partitioning to form a partitioning tree. The root block may start at a predefined level (e.g., from a base block at 128×128 or 64×64 level). Partitions 501, 502, 503, 504, 505, 506, 507, 508, 509, and 510 shown in FIG. 5 include various 2:1/1:2 and 4:1/1:4 rectangular partitions. The partition type may also include partitions from a ternary partitioning scheme that may be implemented vertically, as shown in partition 511, or horizontally, as shown in partition 512. While the example split ratio in FIG. 5 is shown as 1:2:1 for partitions 511 and 512, other ratios may be used. FIG. 5 also shows partition types that include partitions from an uneven 4-way split/partitioning scheme that may be implemented horizontally, as shown in partitions 513 and 514, or vertically, as shown in partitions 515 and 516. Partition 513 is horizontally split into 1:2:4:1 regions. Partition 514 is horizontally split into 1:4:2:1 regions. Partition 515 is vertically split with 1:2:4:1 regions. Partition 516 is vertically split with 1:4:2:1 regions.

The region type flags described in FIGS. 4A and 4B may be entropy coded using a probability model conditioned on one or more of factors (e.g., coded information) described below. In some embodiments, a block size of a current block is considered as the context for the probability model that is used to entropy encode the region type flag for the current block. The block size may include any of: block width, block height, minimum of block width and block height, maximum of block width and block height, and multiplication of block width and height. For example, region 426 in FIG. 4B may have a block size of 32×16, which provides the context for the probability model that is used to entropy encode the region type flag for region 426. Such embodiments may thus utilize a correlation between block sizes and region type flags to achieve better entropy coding efficiency.

In some embodiments, a block size group of a current block is the context for the probability model that is used to encode the region type flag for the current block. For example, a first block size group may include blocks of several different sizes, such as 4×16, 8×8, 4×8, while a second block size group may include blocks of different sizes, such as 32×32, 32×16, 16×32, and 16×16, and a third block size group covers all remaining block sizes. As another example, a first block size group may include blocks having sample sizes from 4 to 32, and a second block size group include blocks having sample sizes from 33 to 64. Different numbers of block size groups can be used, and the block size group can be used as the context for the probability model for entropy encoding the region type flag. For example, region 426 in FIG. 4B may have a block size of 32×16 that belongs to a second block size group. The second block size group is then used as context for the probability model used to entropy encode the region type flag for region 426. Here, a correlation between block size group and region type flags may help to achieve better entropy coding efficiency.

In some embodiments, instead of, or in addition to, the current block size and the block size group of the current block, block sizes and block size groups of a set of neighboring blocks are used as the context for the probability model for entropy encoding the region type flag. Returning to the example of the region 426 in FIG. 4B, neighboring blocks to the current block in the region 426 may include blocks from the region 424 and the region 422 (e.g., at the same partition level). In this example, one or more of: the block size of 32×32 for the region 422, the block size of 32×16 for the region 424, the block size of 32×16 for the region 424, and/or block size groups for the respective regions may be used as the context for the probability model.

In some embodiments, multiple contexts are used (e.g., maintained and/or updated). For example, if the block sizes of the neighboring blocks are smaller than the block size of the current block, a first context is used for the probability model. Otherwise, if the block sizes of the neighboring blocks are all larger than the block size of current block size, a second context is used. Otherwise, a third context may be used. For example, for a current block in the region 426 having a block size of 32×16, a neighboring block of the region 422 has a block size of 32×32 that is larger than the current block, while a neighboring block of the region 424 has a block size of 32×16, which is the same size as the current block. Thus, the third context is used for the probability model in this example.

In some embodiments, multiple contexts may be used (e.g., employed) for each block size group. For example, if the block size group of the neighboring blocks are different from the block size group of the current block, a first context is used for the probability model. Otherwise, a second context is used for the probability model. Because the current block size group in the region 426, the region 422 and the region 424 are the same (e.g., the second block size group spans block sizes of 32× 32, 32×16, 16×32, and 16×16), the second context is used for the probability model in this example.

In some embodiments, region type flags of the set of neighboring blocks of a current block are used as the context for the probability model. Optionally, the block size and/or block size group of the current block may additionally be used as the context. For example, for a current block in the region 420, a neighboring region 410 has a mixed_region-_flag, which is used as the context for the probability model to entropy encode the region type flag for the region 420. In some embodiments, region type flags from regions 422, region 424, and region 426 are also considered in the set of neighboring blocks for the region 420.

In some embodiments, if none of the neighboring blocks are coded as an intra region, the first set of contexts is used. Otherwise, if one of the neighboring blocks is coded as an intra region, the second set of contexts is used. Otherwise, the third set of contexts is used. For example, for the region 420, because the neighboring region 410 is not intra-coded, the first set of contexts is used. In contrast, for the region 426, because one of the neighboring regions (region 424) is intra-coded, the second context is used.

In some embodiments, the region type flags of two or more additional neighboring blocks are checked, including, e.g., the above neighboring block of the top-left sample in the current block and the left neighboring block of the top-left sample in the current block. For example, for a current block in region 412, the region type flag of region 418, which is the above neighboring block of the top-left sample 436 is checked (region 418 has an intra_region_flag), and the region type flag of region 424, which is the left neighboring block of the top-left sample 436 is checked (region 424 has an intra_region_flag). In some embodiments, the two neighboring blocks that are checked include, e.g., the above neighboring block of the top-right sample in the current block and the left neighboring block of the bottom-left sample in the current block. For example, for a current block in region 424, the region type flag of region 422, which is the above neighboring block of the top-right sample 438 is checked (region 422 has an inter_region_flag), and the region type flag of region 434, which is the left neighboring block of the bottom-left sample 440, is checked (region 434 has an inter_region_flag). The region type flags of these additional neighboring blocks are used as the context for the probability model to entropy encode the region type flag for the region 424.

In some embodiments, the number of signaled region_type_flags before the current block from other partitions derived from the original largest coding block. For example, for a current block in region 420, there are two other signaled region_type_flags-one from the original top region 402 (a mixed_region_flag) and one from region 410 (another mixed_region_flag). The number of signaled region_type_flags (e.g., two in the example above) is used as the context for the probability model to entropy encode the region type flag for the region 420.

In some embodiments, the prediction mode flags of the set of neighboring blocks of a current block are used as the context for the probability model. The prediction mode flags indicate whether the blocks are intra-coded, inter-coded, or intra-inter coded. Optionally, the block size and/or block size group of the current block may additionally be used as the context. For example, for a current block in the region 426, a neighboring region 424 has an intra prediction mode flag, and the neighboring region 422 has an inter prediction mode flag, which are both used as the context for the probability model to entropy encode the region type flag for the region 426.

In some embodiments, if none of the neighboring blocks are intra-coded, a first set of contexts is used. Otherwise, if one of the neighboring blocks is intra-coded, a second set of contexts is used. Otherwise, a third set of contexts is used. For example, for the region 426, because the neighboring region 424 is coded using the intra prediction mode, the second set of contexts is used to entropy encode the region type flag for the region 426. In some embodiments, the partition type of current block and/or partition type of the set of neighboring blocks of a current block are used as the context for the probability model that is used to entropy encode the region type flag for the current block.

As an example of using the partition type of a current block and/or a set of neighboring blocks as context to entropy encode the region type flag for the current block, for a current block in the region 412, coded information indicating that a neighboring region 414 uses a binary horizontal split as its partition type, is used as the context for the probability model to entropy encode the region type flag for the region 412.

In some embodiments, a partition type of the current block determines whether the region type flag is signaled. For example, the region_type_flag is not signaled when uneven 4-way split partitioning (e.g., producing partitions 513, 514, 515, and 516 shown in FIG. 5) is employed. As another example, the region_type_flag is only signaled when horizontal or vertical binary tree split (e.g., partitions 507, 508 shown in FIG. 5) is employed (e.g., for regions 410, 420, and for regions 412, 414, and 416 and 418).

In some embodiments, the partition depth the current block is used as the context for the probability model that is used to entropy encode the region type flag for the current block. The partition depth indicates the number of block splits to reach the current partition from the root node (or the top region). For example, for a current block in the region 412, which is a level 3 partition, the partition depth is two. The partition depth is then used to provide the context for the probability model to entropy encode the region type flag for the region 412.

In some embodiments, the partitioning series of the current block is used as the context for the probability model that is used to entropy encode the region type flag for the current block. The partitioning series is the sequence of partitioning modes from the root node (e.g., top region 402) to the current block. For example, for a current block in the region 412, the partitioning series starts with a vertical binary split (to yield region 420) followed by a horizontal binary split. The partitioning series is then used to provide the context for the probability model to entropy encode the region type flag for the region 412.

In some embodiments, blocks under an intra region are only allowed to further split within N depth. For example, N is set to 1 or 2. As an example, the region 420 is has the intra_region_flag, and is split to a depth of 2 at the leaf nodes (region 416 and region 418). In some embodiments, the value of N for a block of a first color component (e.g., Cb) is determined based on the partitioning depth of the collocated block that belongs to a second color component (e.g., Cr). For example, if the collocated Cr block has a depth N of 2, the value of N for the Cb block may also be determined as 2.

In some embodiments, if a block width is equal to a block height (e.g., the block is a square block) for a coding block having the intra_region_flag, only a limit set of partitioning modes are allowed (e.g., horizontal (e.g., partition 508) or vertical binary split (e.g., partition 507), or quadtree split (e.g., partition 510)) for chroma blocks within the intra region. In some embodiments, the allowed subset of partition types for the chroma blocks within the intra region (optionally partitioned from an inter frame) depends on the partition modes used for the luma blocks.

In some embodiments, a quantization step size or a quantization parameter (qp) index for the current frame/slice from which the current block is partitioned (e.g., from which top region 402 is partitioned), or the base qp index for a current video sequence provides the context for the probability model to entropy encode the region type flag for a current block. In some embodiments, the picture type of the frame from which the current block is partitioned (e.g., intra frame, key frame, or inter frame) provides the context for the probability model to entropy encode the region type flag for a current block. In some embodiments, for a current block partitioned from an inter frame, the position of the inter frame in a pyramid structure of video frames provides the context for signaling the region type flag. In some embodiments, the region type flag is coded using a probability model conditioned on previously coded region type flags (e.g., previous instances of region_type_flags) without additional context.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video bitstream comprising a plurality of coding blocks. The system identifies (604) a coding region that comprises two or more coding blocks of the plurality of coding blocks that are encoded in a first prediction mode (e.g., an intra mode, an inter mode, or an inter-intra mode). The system entropy decodes (606) a signaled flag (e.g., a region_type_flag) indicating a prediction mode for the coding region, the entropy decoding using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks. The system reconstructs (608) the two or more coding blocks according to a value of the signaled flag for the coding region. As an example, when splitting a first block into one or more subblocks, a flag is received at a decoding component to indicate whether all the subblocks within the first block are coded with a first predefined prediction mode. The first predefined prediction mode may be an intra coding mode, an inter coding mode, and/or a mixture of intra and inter coding mode. The signaling of the flag may depend on the coded information of current block and/or its neighboring blocks.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of coding blocks. The system identifies (654) a coding region that comprises two or more coding blocks of the plurality of coding blocks that are to be encoded in a first prediction mode. The system entropy encodes (656) a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks. The system signals (658) the entropy encoded flag in a video bitstream. The system encodes (660) the two or more coding blocks into the video bitstream according to a value of the entropy coded flag for the coding region. As described previously, the encoding process may mirror the decoding processes described herein. For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream comprising a plurality of coding blocks; (ii) identifying a coding region that comprises two or more coding blocks of the plurality of coding blocks that are encoded in a first prediction mode; (iii) entropy decoding a signaled flag indicating a prediction mode for the coding region, the entropy decoding using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks; and (iv) reconstructing the two or more coding blocks according to a value of the signaled flag for the coding region. For example, when splitting (e.g., recursively, or using a pre-defined splitting pattern) a first block into one or multiple of equal size or smaller size sub-blocks, at least one flag, called region_type_flag, is received at the decoder side to indicate whether all the sub-blocks within this first block are coded with a first pre-defined prediction mode or not. The said first pre-defined prediction mode can be an intra coding mode, and/or an inter coding mode, and/or a mixture of intra and inter coding mode. The signaling of region_type_flag may depend on the coded information of current block and/or its neighboring blocks. For example, the context for signaling the region_type_flag may depend on the block size of current block, and the block size may be referred as but not limited to block width, block height, minimum of block width and block height, maximum of block width and block height, multiplication of block width and height. For example, the context for signaling the region_type_flag may depend on the block size group of current blocks. For example, the context for signaling the region_type_flag may depend on the block size or block size group of the current block and the block size or block size group of its neighboring blocks. For example, the context for signaling the region_type_flag may depend on the region_type flags of the neighboring blocks. For example, the region_type_flag may depend on itself, no additional context needed. In some embodiments, the set of neighboring coding blocks consists of coding blocks that are adjacent to the current coding block. In some embodiments, the set of neighboring coding blocks comprises one or more adjacent neighboring blocks and one or more non-adjacent neighboring blocks.

(A2) In some embodiments of A1, the coded information comprises flags from the set of neighboring coding blocks that are a same type of flag as the signaled flag for the coding region. For example, the context for signaling the region_type_flag may depend on the region_type flags of the neighboring blocks. For example, the context for signaling the region_type_flag may depend on the region_type_flag of the neighboring blocks and/or the block size and/or block size group of current block. For example, if none of the neighboring blocks are coded as intra region, the first set of contexts is used. Otherwise, if one of the neighboring blocks is coded as intra region, the second set of contexts is used. Otherwise, the third set of contexts is used. For example, in addition to the above, two neighboring blocks are checked, including but not limited to the above neighboring block of the top-left sample in the current block and the left neighboring block of the top-left sample in the current block. As an example, in addition to the above, two neighboring blocks are checked, including but not limited to the above neighboring block of the top-right sample in the current block and the left neighboring block of the bottom-left sample in the current block.

(A3) In some embodiments of A1 or A2, the signaled flag is a region type flag, and where the coded information comprises a count of signaled region type flags from coding blocks within the coding region. For example, the context for signaling the region_type_flag may depend on the counts of signaled region_type_flags before the current block in the same largest coding block.

(A4) In some embodiments of any of A1-A3, the coded information comprises flags from the set of neighboring coding blocks that are a different type of flag than the signaled flag for the coding region. For example, the context for signaling the region_type_flag may depend on the prediction mode (e.g., whether it is coded by intra, inter or intra-inter prediction modes) flags of the neighboring blocks. In an example, the context for signaling the region_type_flag may depend on the prediction mode of the neighboring blocks and/or the block size and/or block size group of current block. In an example, if none of the neighboring blocks are coded as intra prediction mode, the first set of contexts is used. Otherwise, if one of the neighboring blocks is coded as intra prediction mode, the second set of contexts is used. Otherwise, the third set of contexts is used.

(A5) In some embodiments of A4, the signaled flag for the coding region is entropy coded using coded information based on signaled flags from the set of neighboring coding blocks indicating a respective prediction mode of the set of neighboring coding blocks. For example, the context for signaling the region_type_flag may depend on the prediction mode (e.g., whether it is coded by intra, inter or intra-inter prediction modes) flags of the neighboring blocks. For example, the context for signaling the region_type_flag may depend on the prediction mode of the neighboring blocks and/or the block size and/or block size group of current block. For example, if none of the neighboring blocks are coded as intra prediction mode, the first set of contexts is used. Otherwise, if one of the neighboring blocks is coded as intra prediction mode, the second set of contexts is used. Otherwise, the third set of contexts is used.

(A6) In some embodiments of A5, the coded information further comprises one or more of: a partition type of the current coding block, a partition depth of the current coding block, and signaled flags from the set of neighboring coding blocks indicating a respective partition type of the set of neighboring coding blocks. For example, the context for signaling the region_type_flag may depend on the partition type of current block and/or the partition type of its neighboring blocks. For example, the context for signaling the region_type_flag may depend on the partitioning depth (the number of block splits needed to reach the current partition) of the current block.

(A7) In some embodiments of any of A1-A6, the method further includes partitioning a current frame of the video bitstream to obtain the coding region, wherein the coded information further comprises one or more of: a quantization step size or a quantization parameter index for the current frame, a base quantization parameter index for a current video sequence that comprises the current frame, a picture type, and a partitioning series. For example, the context for signaling the region_type_flag may depend on the picture type, for example but not limited to, intra frame, key frame, inter frame. For example, the context for signaling the region_type_flag may depend on the quantization step size or the qp index for current frame/slice, or the base qp index for current video sequence.

(A8) In some embodiments of any of A1-A7, the method further includes partitioning a current frame of the video bitstream to obtain the coding region, wherein, when the current frame corresponds to an inter frame, the coded information that further comprises a position of the current frame in a pyramid structure of video frames. For example, the context for signaling the region_type_flag, when it is used in a inter frame, may depend on the position of the frame in the pyramid structure of video frames. In some embodiments, in accordance with a determination that the current frame corresponds to an inter frame, receiving the signaled flag for the coding region that is entropy coded using coded information that further comprises a position of the current frame in a pyramid structure of video frames. In some embodiments, in accordance with a determination that the current block meets one or more criteria, partitioning chroma blocks within a coding region that comprises blocks encoded in an intra prediction mode using a restricted set of partitioning modes.

(A9) In some embodiments of any of A1-A8, the method further includes, when the current coding block meets one or more criteria, partitioning chroma blocks within a coding region encoded in an intra prediction mode using a restricted set of partitioning modes. For example, if block width is equal to block height, only horizontal or vertical binary split, or quadtree split is allowed for chroma blocks within one intra region in inter frames. In an example, the allowed subset of partition types depends on the luma partition modes. In some embodiments, the restricted set of partitioning modes is a subset of partitioning modes available for other chroma blocks of the plurality of coding blocks. In some embodiments, the restricted set of partitioning modes is a subset of partitioning modes available for luma blocks of the current coding block.

(A10) In some embodiments of any of A1-A9, the method further includes, when a partition type of the current coding block meets one or more criteria, parsing a region type flag from the video bitstream; and when the partition type of the current coding block does not meet the one or more criteria, forgoing parsing the region type flag from the video bitstream. For example, region_type flag may depend on the partition type of current block. As an example, the region_type_flag is not signaled when uneven 4-way partitioning is employed. As an example, the region_type_flag is only signaled when horizontal or vertical binary tree split is employed. In some embodiments, in accordance with a determination that a partition type of the current block meets one or more criteria, signaling a region type flag. In some embodiments, in accordance with a determination that the partition type of the current block does not meet the one or more criteria, forgoing signaling the region type flag.

(A11) In some embodiments of any of A1-A10, the method further includes, when the current coding block meets one or more criteria, partitioning the current coding block within a first depth. For example, blocks under an intra region is only allowed to further split within N depth. In an example, N is set to 1 or 2. As an example, to determine the value of N for a block that belongs to a first color component, the partitioning depth of the collocated block that belongs to a second color component is used to determine the value of N. In some embodiments, in accordance with a determination that the current block meets one or more criteria, partitioning the current block within a first depth.

(A12) In some embodiments of any of A1-A11, the signaled flag is entropy coded using one of a plurality of contexts. For example, for each block size, multiple contexts may be employed. If the block sizes of the neighboring blocks are smaller than the block size of current block size, the first context is employed. Otherwise, if the block sizes of the neighboring blocks are all larger than the block size of current block size, the second context is employed. Otherwise, the third context is employed. For example, for each block size group, multiple contexts may be employed. If the block size group of the neighboring blocks are different from the block size group of current block, a first context is employed. Otherwise, a second context is employed.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data comprising a plurality of coding blocks; (ii) identifying a coding region that comprises two or more coding blocks of the plurality of coding blocks that are to be encoded in a first prediction mode; (iii) entropy encoding a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks; (iv) signaling the entropy encoded flag in a video bitstream; and (v) encoding the two or more coding blocks into the video bitstream according to a value of the entropy coded flag for the coding region.

(B2) In some embodiments of B1, the signaled flags for the set of neighboring coding blocks comprise flags that are a same type of flag as the entropy encoded flag for the coding region.

(B3) In some embodiments of B2, the signaled flag is a region type flag, and the information comprises a count of signaled region type flags from coding blocks within the coding region.

(B4) In some embodiments of any of B1-B3, the signaled flags for the set of neighboring coding blocks comprise flags from the set of neighboring coding blocks that are a different type of flag as the entropy encoded flag for the coding region.

(B5) In some embodiments of any of B1-B4, the information further comprises one or more of: a quantization step size or a quantization parameter index for a current frame, a base quantization parameter index for a current video sequence that comprises the current frame, a picture type, a partitioning series, and a position of the current frame in a pyramid structure of video frames.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data, where the video bitstream includes: (a) a plurality of encoded blocks corresponding to the plurality of frames; (b) identification of a coding region of a frame of the plurality of frames, wherein the coding region comprises two or more coding blocks that are encoded in a first prediction mode; and (c) a signaled flag for the coding region that is entropy coded using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks.

(C2) In some embodiments of C1, the coded information comprises flags from the set of neighboring coding blocks that are a same type of flag as the signaled flag for the coding region.

(C3) In some embodiments of C1 or C2, the coded information comprises flags from the set of neighboring coding blocks that are a different type of flag as the signaled flag for the coding region.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A12, B1-B5, and C1-C3 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A12, B1-B5, and C1-C3 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of coding blocks;
   identifying a coding region that comprises two or more coding blocks of the plurality of coding blocks that are encoded in a first prediction mode;
   entropy decoding a signaled flag indicating the first prediction mode for the coding region, the entropy decoding using coded information comprising one or more of: previous instances of the signaled flag, a block size of a current coding block, a block size group of the current coding block, respective block sizes of a set of neighboring coding blocks, respective block size groups of the set of neighboring coding blocks, and signaled flags for the set of neighboring coding blocks; and
   reconstructing the two or more coding blocks according to a value of the signaled flag for the coding region, wherein the coded information comprises flags from the set of neighboring coding blocks that are a same type of flag as the signaled flag for the coding regio and the signaled flag is a region type flag, and wherein the coded information comprises a count of signaled region type flags from coding blocks within the coding region.

2. The method of claim 1, wherein the coded information comprises flags from the set of neighboring coding blocks that are a different type of flag than the signaled flag for the coding region.

3. The method of claim 2, wherein the signaled flag for the coding region is entropy coded using coded information based on signaled flags from the set of neighboring coding blocks indicating a respective prediction mode of the set of neighboring coding blocks.

4. The method of claim 3, wherein the coded information further comprises one or more of: a partition type of the current coding block, a partition depth of the current coding block, and signaled flags from the set of neighboring coding blocks indicating a respective partition type of the set of neighboring coding blocks.

5. The method of claim 1, further comprising partitioning a current frame of the video bitstream to obtain the coding region, wherein the coded information further comprises one or more of: a quantization step size or a quantization parameter index for the current frame, a base quantization parameter index for a current video sequence that comprises the current frame, a picture type, and a partitioning series.

6. The method of claim 1, further comprising partitioning a current frame of the video bitstream to obtain the coding region, wherein, when the current frame corresponds to an inter frame, the coded information that further comprises a position of the current frame in a pyramid structure of video frames.

7. The method of claim 1, further comprising:
   when the current coding block meets one or more criteria, partitioning chroma blocks within a coding region encoded in an intra prediction mode using a restricted set of partitioning modes.

8. The method of claim 1, further comprising:
   when a partition type of the current coding block meets one or more criteria, parsing a region type flag from the video bitstream; and
   when the partition type of the current coding block does not meet the one or more criteria, forgoing parsing the region type flag from the video bitstream.

9. The method of claim 1, further comprising: when the current coding block meets one or more criteria, partitioning the current coding block within a first depth.

10. The method of claim 1, wherein the signaled flag is entropy coded using one of a plurality of contexts.

11. A computing system, comprising:
   control circuitry;
   memory; and
   one or more sets of instructions stored in the memory and configured for execution by the control circuitry, the one or more sets of instructions comprising instructions for:
   receiving video data comprising a plurality of coding blocks;
   identifying a coding region that comprises two or more coding blocks of the plurality of coding blocks that are to be encoded in a first prediction mode;
   entropy encoding a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks;
   signaling the entropy encoded flag in a video bitstream; and
   encoding the two or more coding blocks into the video bitstream according to a value of the entropy encoded flag for the coding region, wherein the signaled flags for the set of neighboring coding blocks comprise flags that are a same type of flag as the entropy encoded flag for the coding region and the signaled flag is a region type flag, and wherein the information comprises a count of signaled region type flags from coding blocks within the coding region.

12. The computing system of claim 11, wherein the signaled flags for the set of neighboring coding blocks comprise flags from the set of neighboring coding blocks that are a different type of flag as the entropy encoded flag for the coding region.

13. The computing system of claim 11, wherein the information further comprises one or more of: a quantization step size or a quantization parameter index for a current frame, a base quantization parameter index for a current video sequence that comprises the current frame, a picture type, a partitioning series, and a position of the current frame in a pyramid structure of video frames.

14. A non-transitory computer-readable storage medium storing a video bitstream that is generated by a video encoding method, the video bitstream comprising:

coded information for a plurality of pictures of video data, including a first picture having a coding region comprising two or more coding blocks; and a flag indicating the first prediction mode for the coding region using information comprising one or more of: previous instances of the flag, a block size of a current coding block, a block size group of the current coding block, respective block sizes of a set of neighboring coding blocks, respective block size groups of the set of neighboring coding blocks, and signaled flags for the set of neighboring coding blocks;

the signaled flags for the set of neighboring coding blocks, including region-type flags that are a same type of flag as the flag for the coding region, wherein the information comprises a count of signaled region type flags from coding blocks within the coding region;

wherein the video encoding method comprises:

entropy encoding the flag indicating the first prediction mode for the coding region; and encoding the two or more coding blocks into the video bitstream according to a value of the entropy encoded flag for the coding region.

15. The non-transitory computer-readable storage medium of claim 14, wherein the coded information comprises flags from the set of neighboring coding blocks that are a different type of flag as the signaled flag for the coding region.

16. The non-transitory computer-readable storage medium of claim 14, wherein the information further comprises one or more of: a quantization step size or a quantization parameter index for a current frame, a base quantization parameter index for a current video sequence that comprises the current frame, a picture type, a partitioning series, and a position of the current frame in a pyramid structure of video frames.

\* \* \* \* \*